United States Patent
Reial et al.

(10) Patent No.: US 10,277,338 B2
(45) Date of Patent: Apr. 30, 2019

(54) EFFICIENT SCHEDULING OF BEAM QUALITY MEASUREMENT SIGNALS TO MULTIPLE WIRELESS DEVICES

(71) Applicant: Telefonaktiebolaget LM Ericsson (publ), Stockholm (SE)

(72) Inventors: Andres Reial, Malmö (SE); Icaro L. J. da Silva, Solna (SE); Johan Rune, Lidingö (SE); Henrik Sahlin, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/535,436

(22) PCT Filed: Mar. 23, 2016

(86) PCT No.: PCT/EP2016/056419
§ 371 (c)(1),
(2) Date: Jun. 13, 2017

(87) PCT Pub. No.: WO2017/162283
PCT Pub. Date: Sep. 28, 2017

(65) Prior Publication Data
US 2018/0062770 A1 Mar. 1, 2018

(51) Int. Cl.
*H04B 17/00* (2015.01)
*H04B 17/16* (2015.01)
(Continued)

(52) U.S. Cl.
CPC ............. *H04B 17/16* (2015.01); *H04B 7/063* (2013.01); *H04B 7/0695* (2013.01); *H04W 16/28* (2013.01); *H04W 24/08* (2013.01)

(58) Field of Classification Search
CPC ...... H04B 17/16; H04B 7/063; H04B 7/0695; H04W 16/28; H04W 24/08
See application file for complete search history.

(56) References Cited

U.S. PATENT DOCUMENTS

2009/0196203 A1* 8/2009 Taira .................... H04B 7/0617
370/280
2016/0028519 A1 1/2016 Wei
(Continued)

OTHER PUBLICATIONS

Nokia Networks, "CSI types and reporting modes design for FD-MIMO", 3GPP TSG RAN WG1 Meeting #82bis, Oct. 5-9, 2015, pp. 1-3, Malmö, Sweden, R1-155826.

*Primary Examiner* — Xin Jia
(74) *Attorney, Agent, or Firm* — Coats & Bennett, PLLC

(57) ABSTRACT

The disclosure relates to methods, devices, and computer programs in mobile communications. More specifically, the proposed technique relates to beam quality reference signals transmitted by the network for use by wireless devices to measure the quality of neighbor cells or beams for mobility purposes. In particular the disclosure relates to a method, performed in a wireless communication system for scheduling beam quality measurement signals to be transmitted from one or more access points 20 to a plurality of wireless devices 10. The method comprises obtaining S1, for each of the plurality of wireless devices 10, information defining time periods when the transmission of beam quality measurement signals from the one or more access points 20 to the plurality of wireless devices 10 is to be performed and obtaining S2, for each of the plurality of wireless devices 10, candidate beams 40 for transmission of beam quality measurement signals from the one or more access points to the wireless device. The proposed methods further comprises scheduling S5 common beam quality measurement signals, usable by at least two of the plurality of wireless devices 10, are scheduled during overlaps of the obtained time periods, in at least two of the obtained candidate beams that are at least partly overlapping, and providing S6 information about the scheduled beam quality measurement signals to the access points 20 and/or wireless devices 10.

20 Claims, 7 Drawing Sheets

(51) Int. Cl.
  *H04B 7/06*   (2006.01)
  *H04W 16/28*  (2009.01)
  *H04W 24/08*  (2009.01)

(56) References Cited

U.S. PATENT DOCUMENTS

2017/0156097 A1* 6/2017 Weber .............. H04W 36/0072
2018/0220406 A1* 8/2018 Mizusawa .......... H04W 72/046

* cited by examiner

EFFICIENT SCHEDULING OF BEAM QUALITY MEASUREMENT SIGNALS TO MULTIPLE WIRELESS DEVICES

TECHNICAL FIELD

The disclosure relates to methods, devices, and computer programs in mobile communications. More specifically, the proposed technique relates to beam quality reference signals, transmitted by the network for use by wireless devices, to measure the quality of neighbor beams for mobility purposes. In particular the disclosure relates to efficient scheduling of beam quality measurement signals.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink and is thought of as a next generation mobile communication system relative to UMTS. In order to support high data rates, LTE allows for a system bandwidth of 20 MHz, or up to 100 MHz when carrier aggregation is employed. LTE is also able to operate in different frequency bands and can operate in at least Frequency Division Duplex, FDD, and Time Division Duplex, TDD, modes.

In an E-UTRAN, a User Equipment, UE, or a wireless device is wirelessly connected to a Radio Base Station, RBS, commonly referred to as a NodeB, NB, in UMTS, and as an evolved NodeB, eNodeB or eNB, in LTE. A Radio Base Station, RBS, or an access point is a general term for a radio network node capable of transmitting radio signals to a UE and receiving signals transmitted by a UE. In Wireless Local Area Network, WLAN, systems the wireless device is also denoted as a Station, STA.

LTE uses downlink reference signals transmitted by the eNodeBs. A user equipment, UE, receiving the reference signal can measure the quality of neighbor cells for mobility purposes. In LTE, the some reference signals are broadcasted in an always-on manner and over the full bandwidth, regardless of the presence or position of UEs in the system. These signals are called cell specific reference signals, CRS, and are easy to measure and yield consistent results, but the static signaling leads to high resource usage, interference, and energy consumption. Hence, the CRS do not depend/change per user but remain same for all the users and entire system, or part of the system, once configured.

In the future communication networks, also referred to as the 5th generation mobile networks, there will be evolvement of the current LTE system to the so called 5G system. The main task for 5G is to improve throughput and capacity compared to LTE. This is in part to be achieved by increasing the sample rate and bandwidth per carrier. 5G is also focusing on use of higher carrier frequencies i.e., above 5-10 GHz.

Future communications networks are expected to use advanced antenna systems to a large extent. With such antennas, signals will be transmitted in narrow transmission beams to increase signal strength in some directions, and/or to reduce interference in other directions. When the antenna is used to increase coverage, handover may be carried out between transmission beams of the serving radio access network node or of the neighbour radio access network nodes. The transmission beam through which the radio access network node is currently communicating with the wireless device is called the serving beam and the transmission beam it will hand over to, or switch to, is called the target beam. The potential target beams for which measurements are needed are called candidate beams.

Applying the principle of continuous transmission of reference signals in all individual transmission beams in such a future cellular communications network may be convenient for wireless device measurements, but it may degrade the performance of the network. For example, continuous transmission of reference signals in all individual transmission beams may consume resources available for data, and generate a lot of interference in neighbouring cells, and higher power consumption of the radio access points.

To avoid always-on signaling, one possible approach is that the network turns on beam quality measurement signals, MRS, in a UE-specific manner only in relevant candidate beams and in situations when mobility is likely needed (e.g. when signal strength is decreasing and/or load balancing needs to be applied). Then the candidate beams are selected from a fixed grid of beams. Measurements are initiated when the network obtains that a beam update for the UE may be needed, e.g. when decreasing serving beam quality is detected due to UE movement, or when the UE needs to acquire a serving beam when accessing a new frequency band for the first time. The candidate beams may be transmitted from a single access point or from several access points. The network can configure the UE (via RRC signaling) to measure and report candidate beam quality, preferably including the list of MRSs to measure. The UE thus receives an MRS measurement command indicating the Time/Frequency, T/F resources and sequences of the MRS to measure, as well as the measurement and reporting configuration. Once the UE has performed mobility measurements and reported the results, the network turns the candidate beams off again, i.e. the MRS transmissions in the candidate beams cease. Separation between MRS of adjacent beams may be achieved e.g. using multiplexing into different time-frequency fields and/or using code multiplexing using (near-) orthogonal sequences here referred to as MRS sequences (or beam quality signal sequences), occupying the same time-frequency field.

The MRS signatures and T/F resource allocation for the individual candidate beams to a given UE is preferably coordinated among the access points transmitting candidate beams e.g. via a central coordination unit and inter-access point interfaces or via an enhanced X2-type interface connecting the 5G eNBs. The coordination is done to guarantee unique MRS sequences and/or efficient use of T/F resources. The coordinated allocation is done on a per-UE and per-session basis to allow high flexibility for resource allocation to beams. Here, a session denotes receiving a measurement command, performing a set of measurements of one or more beams, and reporting the results. The per-session coordination is preferably required. It is not efficient system design, and often not even practical, to associate every beam in every access point with fixed unique MRS parameters—that would imply an excessively large MRS sequence space and reserved T/F resources unavailable for other purposes.

The number of candidate beams that are activated at mobility measurement sessions varies, but anywhere from a few to several tens of beams may be turned on in some scenarios per one UE. The number of UEs in a certain geographical area also varies, but up to 4000 UEs/km2 may be a typical hotspot density.

However, when the UE density is high, when the beams are wide and/or when the UEs in the network are moving at high velocities, or when beams from source and/or target access points support mobility sessions for several UEs, then the network needs to activate a large number of beam quality reference signals from different access points. This may lead to inefficient usage of resources, beam quality reference signal sequences etc. Hence, there is a need for an improved resource usage during for example mobility measurements sessions.

SUMMARY

An object of the present disclosure is to provide methods and devices configured to execute methods and computer programs which seek to mitigate, alleviate, or eliminate one or more of the above-identified deficiencies in the art and disadvantages singly or in any combination.

This object is achieved by a method performed in a wireless communication system, for scheduling beam quality measurement signals to be transmitted from one or more access points to a plurality of wireless devices. The method comprises obtaining, for each of the plurality of wireless devices, information defining time periods, when the transmission of beam quality measurement signals from the one or more access points to the wireless device is to be performed, and obtaining, for each of the plurality of wireless devices, candidate beams for transmission of beam quality measurement signals from the one or more access points to the wireless device. The method further comprises scheduling common beam quality measurement signals, usable by at least two of the plurality of wireless devices, during overlaps of the obtained time periods, in at least two of the obtained candidate beams that are at least partly overlapping, and providing information about the scheduled beam quality measurement signals to the access points and/or wireless devices.

As a result, duplicate beam quality measurement signal transmission in the same direction is avoided. Thereby, network resources are economized and the capacity impact of beam quality measurement signal transmission is minimized and energy is conserved at the access points.

In addition, beam quality measurement session duration is reduced, in case the duplicates would otherwise have been transmitted as a beam sweep, i.e. not exactly simultaneously.

Furthermore, beam quality measurement coverage and/or beam quality measurement performance is improved, as the total available power of the network node may be focused on fewer beams.

The required number of utilized beam quality measurement signal sequences is also reduced, when two or more wireless devices share the same sequence, which in turn may enable selection of beam quality measurement signal sequences with better separation properties.

According to some aspects, beam quality measurement signals usable by only one of the plurality of wireless devices are scheduled in candidate beams that are separated in time and space from the other candidate beams.

According to some aspects, the scheduling comprises identifying an overlap of at least two of the obtained candidate beams of different wireless devices.

According to some aspects, the method comprises changing the transmission time or beam direction or size, of candidate beams that are potentially at least partly overlapping in space and/or that have a separation in time below a predefined threshold, such that common beam quality measurement signals usable by at least two of the plurality of wireless devices can be scheduled.

Thereby common beam quality measurement signals can be used, even where the initial beam sets were not overlapping, but only were close.

According to some aspects, the method comprises evaluating a difference between scheduling common beam quality measurement signals for candidate beams that are overlapping in time and scheduling only dedicated beam quality measurement signals and applying a beam quality measurement signals configuration wherein common beam quality measurement signals are scheduled for overlapping candidate beams, based on the evaluation. Thereby, the proposed functionality is only enabled when beneficial.

According to some aspects, wireless devices sharing a common beam quality measurement signal also share a common group identifier that can be used to identify information dedicated to the wireless devices. Using a common group identifier enables making signaling more efficient.

According to some aspects, the disclosure also relates to a computer program comprising computer program code which, when executed in a coordination unit, causes the coordination unit to execute any of the aspects of the method as described above and below.

According to some aspects, the disclosure also relates to a coordination unit in a wireless communication system, configured to schedule beam quality measurement signals to be transmitted from one or more access point to a plurality of wireless devices. The coordination unit comprises a communication unit configured to communicate with the access points and/or wireless devices. The coordination unit also comprises a processing circuitry configured to cause the access point to obtain, for each of the plurality of wireless devices, candidate beams for transmission of beam quality measurement signals from the one or more access points to the wireless device, and to obtain, for each of the plurality of wireless devices, information defining time periods when the transmission of beam quality measurement signals from the one or more access points to at least two of the plurality of wireless devices is to be performed. The coordination unit is also configured to schedule common beam quality measurement signals, usable by at least two of the plurality of wireless devices, during overlaps of the obtained time periods, in at least two of the obtained candidate beams that are at least partly overlapping, and to provide information about the scheduled beam quality measurement signals to the access points and/or wireless devices. According to some aspects the coordination unit is comprised in an access point.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
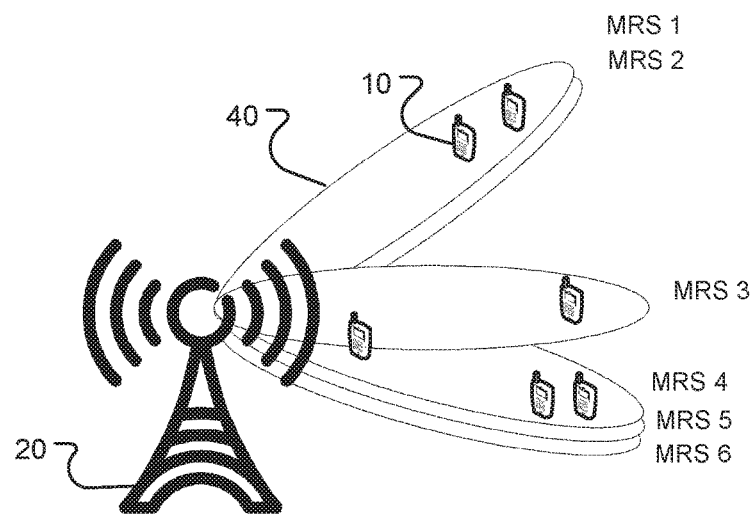
FIG. 1 illustrates multiple beam quality measurement signals in overlapping beam directions to multiple wireless devices from one access point.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

This disclosure proposes a coordination unit and methods performed therein. It must be appreciated that such a unit is not to be regarded exclusively as a physical unit, but it may as well be a functional unit incorporated in one or several physical units. The disclosure relates to scheduling beam quality reference signals from access point to multiple wireless devices. One possible implementation is that the coordination unit is located within or at the access points. However, other implementations are also possible such as the coordination unit being a separate unit or part of one or more other network nodes.

In this application the term "beam quality measurement signal" refers to any reference signal that is usable to measure channel quality in a corresponding beam. In this disclosure mobility measurements are used as an example, but the methods are not restricted thereto, but the technique might as well be applicable e.g. to reference signals used for Channel State Information, CSI, purposes etc. In those cases, the expression a "candidate beams", refers to beams where beam quality measurements needs to be performed.

Within the context of this disclosure, the terms "wireless terminal" or "wireless device" encompass any terminal which is able to communicate wirelessly with another device, as well as, optionally, with an access point of a wireless network) by transmitting and/or receiving wireless signals. Thus, the term "wireless terminal" encompasses, but is not limited to: a user equipment, e.g. an LTE UE, a mobile terminal, a stationary or mobile wireless device for machine-to-machine communication, an integrated or embedded wireless card, an externally plugged in wireless card, a dongle etc. Throughout this disclosure, the term "user equipment" is sometimes used to exemplify various embodiments. However, this should not be construed as limiting, as the concepts illustrated herein are equally applicable to other wireless nodes. Hence, whenever a "user equipment" or "UE" is referred to in this disclosure, this should be understood as encompassing any wireless terminal as defined above.

LTE is here used as a starting point for describing the future beam based systems, also referred to as 5G. LTE uses Orthogonal Frequency Division Multiplexing, OFDM. For a better understanding of the disclosure and the principles of resource allocation in time and frequency, a short introduction to OFDM, is given. Today most wireless standards use OFDM. OFDM is a method of encoding digital data on multiple carrier frequencies. That is, a large number of closely spaced orthogonal sub-carrier signals are used to carry data on several parallel data streams or sub-channels. The reason that OFDM is preferred is mainly due to that it allows for relatively simple receiver processing for a wide bandwidth when the communication channel is frequency selective. OFDM also allows for a simple way to share the channels between different uses, i.e., wireless devices 10 by simply allocating different sets of sub-carriers, i.e., different sub-channels, to different users. This allocation is known as Orthogonal Frequency-Division Multiple Access, OFDMA. The set of sub-carriers allocated to different users may either be localized, i.e., the sub-carriers to one user are next to one another, or the set of sub-carriers may be distributed, i.e., the sub-carriers are spread out and interlaced with sub-carriers carrying data to other users. Each sub carrier is then divided in time into frames, subframes, slots and symbols. The minimum two-dimensional unit is a resource element, which is made up of one symbol in time domain and one sub carrier in frequency domain.

The LTE downlink reference signals are as discussed above classified into Cell specific reference signals, CSRS, and UE specific reference signals, UESRS.

The CSRS is cell specific, which means that, these do not depend/change per user but remain same OFDM resource blocks for all the users and entire system, once configured. These reference signals are used by the UE to estimate the downlink channel and do a relative equalization to remove the channel effect over the signal. Hence the UE will generate the CSRS on his side and do a comparison of the generated and received CSRS to get an estimate of channel effect. The CSRS is transmitted with some specific power, which the UE must know, to calculate the multipath effect and this power is conveyed to the UE using SIB messages. The CSRS is mapped onto symbol 0, 4, 7 and 11 of all downlink subframes in FDD. The CSRS is mapped to every sixth subcarrier in these symbols. The start index is obtained by the physical cell ID.

In contrast to the CSRS the UESRS are allocated on demand on a need basis. There are currently no established systems using on-demand activation for mobility purposes, and the $5^{th}$ generation communication network design is still at a concept stage.

The state of the art on beam-based mobility solutions, teaches that reference signals used for mobility are always scheduled per-wireless device, per measurement session, using dedicated signalling. However, when the UE density is high, the beams are wide, and/or the wireless devices in the network are moving at high velocities, beams from source and/or target nodes supporting mobility sessions for several wireless devices may overlap in time and the network needs to activate a large number of beam formed signals from different access points.

Hence, when using UE specific reference signals different resources in e.g. time and frequency are allocated, despite the overlapping use of the same beam shape towards multiple wireless devices. To schedule several beam quality reference signals usable by different wireless devices in the same beam, using different resources is inefficient resource usage for beam quality reference signals.

This is also inefficient resource usage of downlink control channels when information about overlapping beam quality reference signal resources are signalled separately and thus duplicating control information. It is also inefficient usage of sequences allocated to the beam quality measurement signals, which will likely be a scare resource.

Assuming beam quality measurement signals usage might not always be fully coordinated, the scheme may also generate some interference due to beam quality measurement signal pollution.

The inefficient resource usage is also likely to limit the coverage area of the beam quality measurement signals due to dividing the available transmission power in the access point between more beams.

FIG. 1 depicts the state of the art solution with a wireless device-to-wireless device mapping. In FIG. 1 there is one candidate beam for transmission of a beam quality reference signal MRS 1-6 associated with or usable by each wireless device 10. Hence, the figure shows a single access point 20 with one beam 40 transmitted per wireless device 10, wherein several of the beams are overlapping. Each wireless device is informed about which sequence to monitor. It is also informed by when and where to monitor the radio spectrum. The dedicated references targeting one wireless device are usable by that wireless device only, as the reference signal is not known to the other wireless devices.

Figure 2:
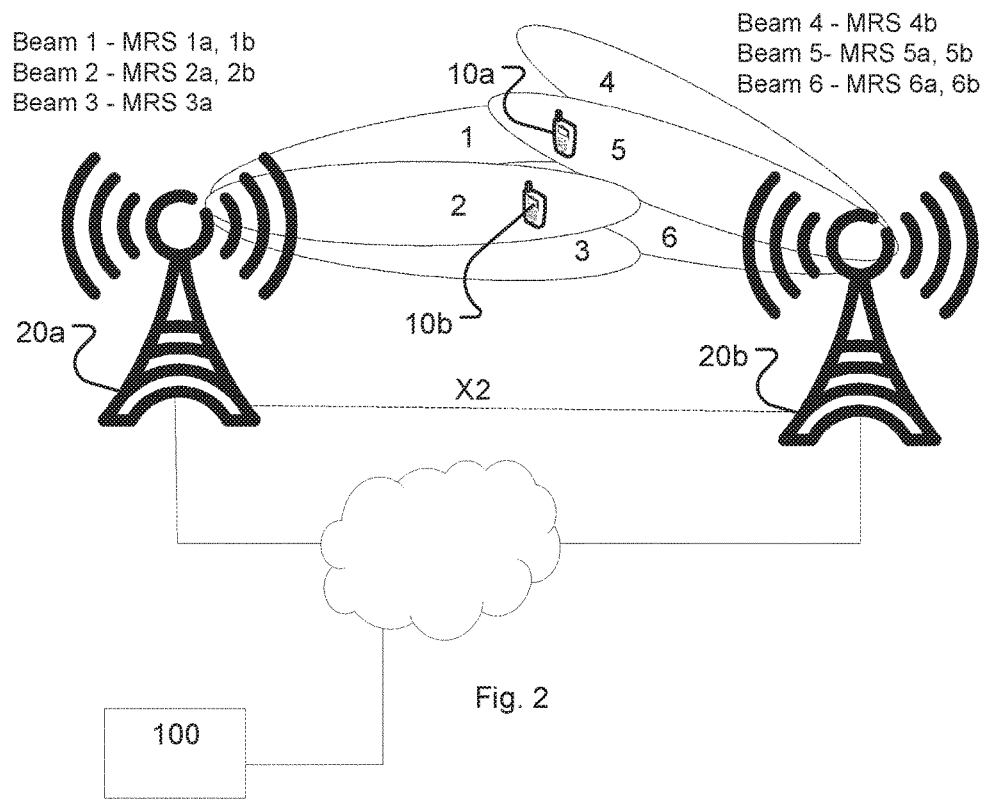
FIG. 2 illustrates multiple beam quality measurement signals in overlapping beam directions to two wireless devices from two access points.

The candidate beams may also be transmitted from several access points. FIG. 2 shows a two-access point setup (which could also be extended to a multi-access point setup), where the two wireless devices 10 (denoted 10a and 10b) have different serving access points 20 (denoted 20a and 20b) and serving beams, and the candidate beam sets for transmission of beam quality measurement signals to the different wireless devices partially overlap. Hence, in this example several beam quality reference signals, here mobility reference signals, MRS, using different sequences and time/frequency resources are transmitted in beams directions 1, 2, 5 and 6. In this example MRS 1a, 2a, 3a, 5a and 6a are used by wireless device 10a and MRS 1b, 2b, 4b, 5b and 6b are used by wireless device 10b. Because beam quality reference signals usable by one wireless device only are transmitted from several access points coordinated scheduling is required.

Several options exist for achieving effectively coordinated MRS allocation of per-UE candidate beams over several access points. The proposed methods can be implemented in combination with any of these approaches. Some options are described below.

The first example is full joint allocation over an entire set of UEs and access points. Information about all access points and UEs is available at a central coordination unit 100, e.g. the serving access point or a dedicated control entity such as a cluster head, a centralized baseband unit, an RNC-like entity or an entity running asynchronous control functions (such as an asynchronous-eNB terminating PDCP/RRC protocols). The joint MRS and Time/Frequency, T/F, resource allocation guarantees lack of MRS conflicts across access points and can provide an efficient T/F resource grouping within each access point (according to a chosen metric). This approach is feasible when a fast backhaul connection is available between the access points (e.g. centralized baseband or a main-remote deployment).

Another possibility is initial coordination performed per-access point, followed by conflict resolution. For each access point, the MRS and T/F resources are obtained locally. If a prior grouping of MRS signatures and T/F resources among the access points exists, there will be no conflicts. If no such grouping exists, each access point may inform its neighbors e.g. using the X2 interface, or a control unit, about the allocations. If a conflict is detected, one of the access points reallocates the conflicting resource. Optionally, an iterative approach may be used, where it is verified that the reallocation did not result in new conflicts, which have to be resolved. To limit the non-deterministic and potentially large delays due to the iterative procedure, it may be preferable to perform only a single round of conflict detection and resolution/reallocation and accept the risk of new undetected conflicts. Avoiding very dense allocations could be one strategy to minimize this risk.

Another approach is initial coordination per-access point, ignoring possible conflicts. This approach is suitable if the MRS space is large, since, even for overlapping T/F resources for several beams, MRS sequence cross-correlation properties provide a certain separation of the individual signals. Avoiding MRS collisions is also facilitated in scenarios where MRS planning ((semi-)manual or as a SON function) is employed, such that each access point is allocated a set of MRS sequences to choose from, with reuse larger than one where the same MRS sequences can only be reused after a certain reuse distance, e.g. two neighbor hops away. With such MRS planning, this coordination method is particularly attractive.

The proposed methods address the drawback that beam quality reference signal configuration on a per-wireless device basis results in duplicate (or multiple) transmission of different beam quality reference signals in the same beam directions and, consequently, duplicate (or multiple) transmissions of downlink control signaling to inform each wireless device of the time and frequency resources where the beam quality reference signals are required.

The inventors have realized that, if the wireless devices are located in a relative proximity to each other, or more generally, their signal strengths experienced for some beams are correlated due to propagation effects, it is likely that some of the candidate beams for one wireless device may also be candidates for another wireless device. Hence, it is proposed that when candidate beam sets for several wireless devices are to be activated at about the same time and in overlapping beam directions, then the per device beams sets are merged into a union beam set to avoid duplication. Using such a union beam set implies that two or more wireless devices share the same reference signal in terms of physical resources and beam quality reference signal sequence.

In other words, a reduced beam set is created by creating a union beam set, where duplicates are removed. Beam quality reference signal sequences and time-frequency resource allocation is then applied to the reduced candidate beam set. This avoids duplicate beam quality reference signal allocation overlapping (or the same) beam direction and allows optimizing the resource usage over the entire set of access points and wireless devices. Hence, the required number of beam quality reference signal sequences as well as the energy consumption can be reduced.

In other words, the proposed technique can be formulated as a method performed in (or in connection to) an access point for improved beam quality reference signal allocation to a group of wireless devices. The principle is to allocate beams for mobility measurement purposes to several wireless devices in the conventional manner and to then detect that multiple wireless devices are allocated duplicate beams with overlapping coverage due to wireless device-specific beam quality reference signal allocation. The disclosure then further proposes performing a beam-merging operation which consists of scheduling the same time-frequency resources and/or beam quality reference signals sequences jointly to a group of wireless devices (wireless device-grouping the beam quality reference signal) and transmitting the beam quality reference signal allocated based on the wireless device grouping.

This new beam allocation method at the network may be transparent to the wireless device. To further save downlink control signaling resources, wireless devices in the group may be allocated a common identity for the purposes of receiving a common, single beam quality reference signal allocation message in the downlink.

Figure 3:
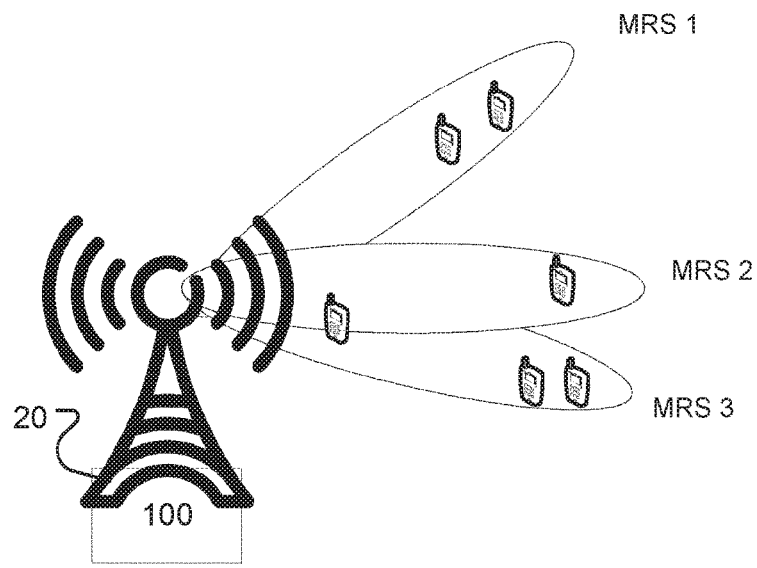
FIG. 3 illustrates optimized beam quality measurement signal transmission to multiple wireless devices from one access point, after removal of overlapping beams according to some aspects of the invention.

FIG. 3 shows an example of the beam quality signal allocation resulting from the proposed methods. In FIG. 3 only one beam quality reference signal is transmitted in each beam. In other words, if two or more wireless devices are located in the same beam direction, they will receive the same signal transmitted on one single resource and using one sequence.

The result should be compared to FIG. 1 for the same wireless device locations but without applying the proposed grouped scheduling. The effect of the proposed allocation is in this example a reduction of the number of transmitted MRSs from 6 to 3.

In FIG. 3, the resource allocation is performed for one access point. The coordination unit 100 performing the scheduling is then located within or at the access point 20. However, in some scenarios candidate beams may be transmitted from separate access points. Coordination between access points is then required. One possibility is to implement the coordination in a remote location such as in another radio network node or in a remote server.

Figure 4:
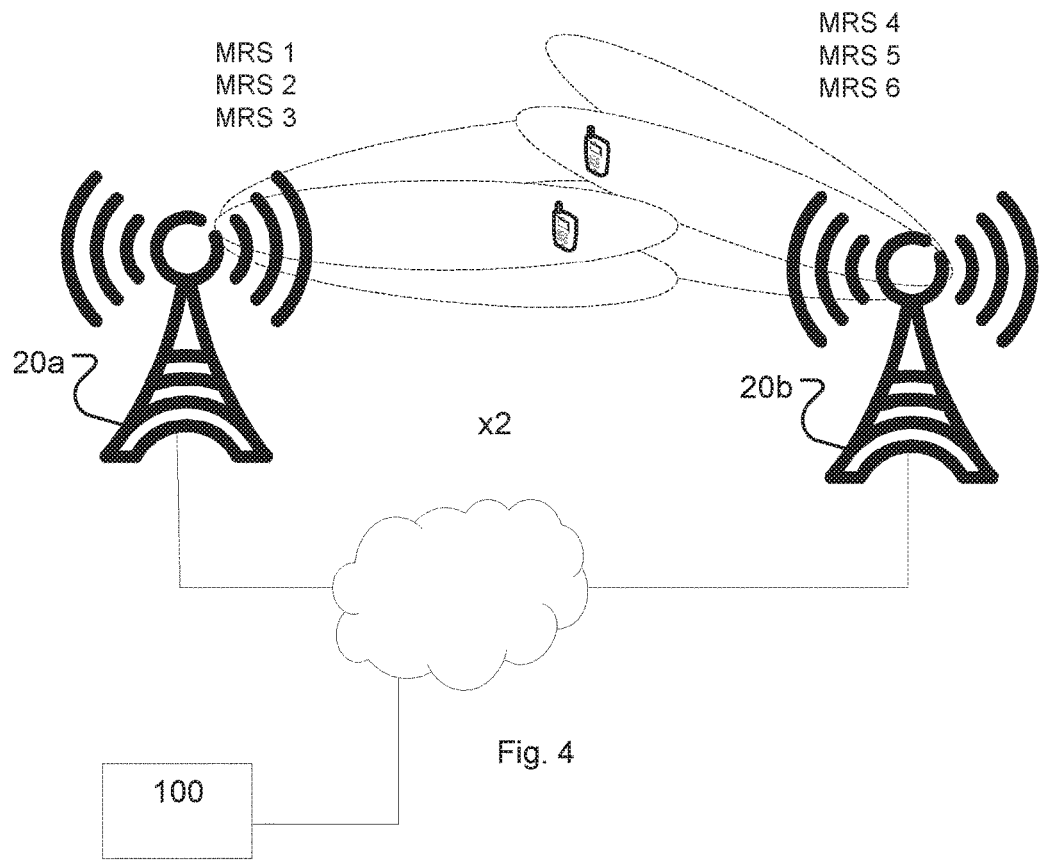
FIG. 4 illustrates a cloud implementation for removal of overlapping beams according to some aspects of the invention.

FIG. 4 illustrates an example of the proposed technique involving several access points 20a, 20b, where the scheduling is performed in a remote coordination unit 100. The coordination unit identifies beam where beam quality reference signals are to be transmitted during at least partly overlapping time periods. In these beams so called common beam quality reference signals usable by several wireless devices are scheduled. The coordination unit informs the different access points about the scheduled beam quality reference signals.

Figure 6:
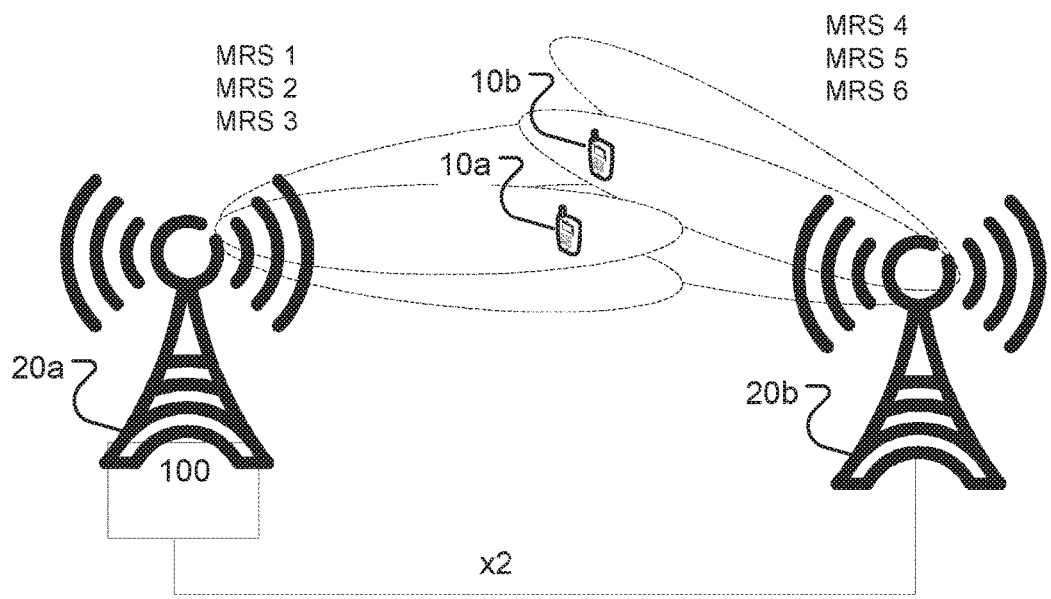
FIG. 6 illustrates an implementation for removal of overlapping beams using signaling over the X2 interface.

Alternatively the scheduling is performed within or at the access point 20, as illustrated in FIG. 6. However, the inter access point signaling (e.g. X2 signaling) is required. Distributed implementations performing the corresponding methods are also possible.

The resulting resource allocation of FIG. 4 should be compared with FIG. 2 for the same wireless device locations, the duplicate transmissions in beams 1, 2, 5 and 6 are omitted, reducing the number of beams from 10 to 6. The reduction is even larger when a larger number of wireless devices share the same candidate beams.

Example Operations

The proposed methods will now be described in more detail referring to FIG. 5. It should be appreciated that FIG. 5 comprises some operations and modules which are illustrated with a solid border and some operations and modules which are illustrated with a dashed border. The operations and modules which are illustrated with solid border are operations which are comprised in the broadest example embodiment. The operations and modules which are illustrated with dashed border are example embodiments which may be comprised in, or a part of, or are further embodiments which may be taken in addition to the operations and modules of the broader example embodiments. It should be appreciated that the operations do not need to be performed in order.

The methods are e.g. performed in the network of FIG. 3, when the wireless devices 10 are moving such that handover to another beam is required. One scenario is e.g. that the wireless devices are on a vehicle such as a train. In communication systems each wireless devices 10 typically continuously signal channel data describing the present channel conditions of the beam currently serving the wireless devices 10. The serving access point, based on the channel data, realizes that handover is approaching and starts to prepare for handover.

This disclosure proposes a method, performed in a wireless communication system, for scheduling beam quality measurement signals to be transmitted from one or more access points 20 to a plurality of wireless devices 10. The proposed methods are e.g. performed in a coordination unit. In the example of FIG. 3, where only one access point is involved, the coordination unit is then typically located in (or in connection with) the access point.

The coordination unit could be in an access point, but the concept may be implemented in a separate unit, as illustrated in FIG. 4. A cloud implementation, where the functionality might be distributed among different devices is also possible. However, it is always the access point or access points that are controlled. Hence, communication between the access points and the physical unit where the coordination is executed is required.

The proposed method comprises obtaining S1, for each of the plurality of wireless devices 10, information defining time periods when the transmission of beam quality measurement signals from the one or more access points 20 to the plurality of wireless devices 10, is to be performed. In other words, the coordination unit needs to know, when beam quality measurement signals are to be transmitted from the different wireless devices 10. A time period is a time span, wherein the beam quality reference signal should be transmitted for measurement purposes. One possible implementation is to, for each of the plurality of wireless devices, obtain information regarding whether reference signaling is required or not within in a defined time interval. In LTE a UE typically needs to carry out their measurements within a certain time window. Typically, this time window is defined as "within a certain time after measuring the need was triggered".

Beam quality measurements are generally controlled by the network. When quality need to be evaluated the access points triggers the served wireless devices 10 to perform measurements on beams that the serving access point indicates, or on any beams the UE can detect. In order to differentiate the different beams, each beam quality signal is assigned a symbol sequence, which is orthogonal (or at least near-orthogonal) to the symbol sequences of neighboring beams. A typical situation when beam quality measurement signals are transmitted is, as discussed above, during preparations for handover.

However, the scheduling unit also needs information regarding in which beam directions the beam quality measurement signals should be transmitted to the respective wireless devices 10. In other words, the proposed method further comprises obtaining S2, for each of the plurality of wireless devices 10, candidate beams 40 for transmission of beam quality measurement signals from the one or more access points to the wireless device. This means that, one or more candidate beams where beam quality reference signals should be transmitted are obtained for each wireless in the area. The candidate beams of one wireless device is referred to as the candidate beam set of the wireless device. If the coordination unit is performed in an access point, the obtaining comprises the actual determination of beams. This is done in a "conventional" manner. Commonly used techniques comprises determination of beams based e.g. on the UE position and look-up table information about coverage areas of the possible candidate beams. To include beams from access points other than the serving access point for a given wireless device, the serving access point may inform other access points about the wireless device position. The beams expected to provide best signal quality for the wireless device in its current position are included as candidate beams by each access point. Each wireless device may thus have candidate beams from several access points. Each candidate beam is characterized e.g. by its direction and beam width.

However, if the coordination unit is separate from the access point, the obtaining S2 comprises receiving information from the coordinated access points. The access point may signal information comprising one beam set per device, or it may signal one union beam set, which will be further discussed below.

Note that determination of candidate beams and time periods i.e. steps S2 and S1 might be done in any order or in combination. What is important is that the scheduling unit obtains access to information about when and where (i.e. in which beam directions); beam quality reference signals are needed for the different UEs. One might e.g. for the specific time check which wireless devices are required to performed in a certain direction. Possible implementations will be further discussed below.

As discussed above this disclosure proposes scheduling common beam quality measurement signals each targeting at least two of the plurality of wireless devices 10, when transmission of the beam quality measurement signals is to be performed at about the same time, in at least two of the obtained candidate beams that are at least partly overlapping. In other words, transmissions that could overlap in time and space are merged into one transmission. This requires that overlapping beams are identified.

In the case when the coordination of beam quality reference signals is performed per access point, the implementation is straight forward, because then all operations can be performed in the access point 20. However, in a distributed implementation the actual identification can be performed in one or several access points, still providing the same result.

However, one possibility is to identify S3 an overlap of at least two of the candidate beams that are of different wireless devices in the coordination unit. If beam quality measurements signals are needed in those directions at overlapping time periods, a common reference signal is scheduled.

In the case of a coordination unit 100 being remote from the access point 20, then according to some aspects, the access points identify overlapping beam directions on its own. Then, as mentioned above, the access point 20 signals the so called union beam set comprising information about beam directions, in which common (and dedicated) beam quality reference signals may be scheduled, to the coordination unit. This implies that the identification S3 does not need to be performed in the same unit as the actual scheduling. Further examples will be given below.

Figure 9:
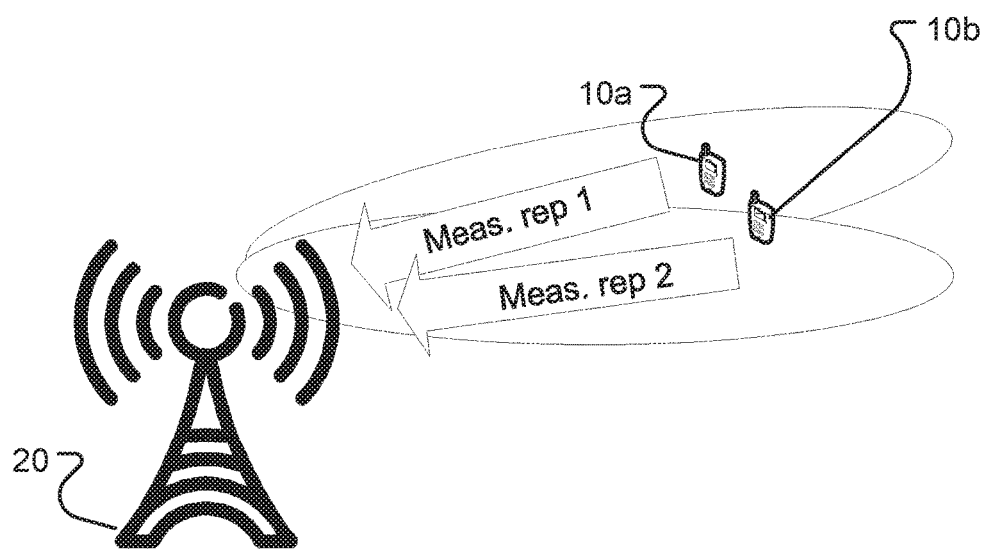
FIG. 9 illustrates detecting that two or more wireless devices are being served by overlapping beams upon the reception of measurement reports from these wireless devices with similar pattern of beams with strong signal strength.

According to some aspects, the identifying S3 comprises detecting reception of channel quality measurement reports received from at least two of the plurality of wireless devices 10 that differ by a quality below a threshold. In other words, the network may detect that two or more wireless devices are being served by overlapping beams, upon the reception of measurement reports from these two or more wireless devices with similar beam pattern, as shown in FIG. 9. One example is two UEs that experience strong signal strength from the same beams.

Another way of obtaining in which beam directions common beam quality measurement signals can be sent is to simply go through the beam directions one by one and check whether there are any wireless devices 10 within that direction and whether those wireless devices are about to receive beam quality reference signals within a certain time frame.

The main concept of the proposed technique will now be described. As mentioned above, the disclosure proposes that common beam quality measurement signals usable by at least two of the plurality of wireless devices 10 are allocated, when transmission of the beam quality measurement signals is to be performed during overlapping time periods, to at least two of the plurality of wireless devices whose obtained candidate beams are at least partly overlapping.

The method comprises scheduling the beam quality measurement signals for transmission in the obtained candidate beams at the time periods defined by the obtained information. However, in contrast to prior art solutions, dedicated beam quality reference signals are not exclusively used. Instead, when several beam directions overlap, one common beam quality reference signal usable by several devices is used. This does not exclude that beam quality measurement signals usable by only one of the plurality of wireless devices 10 are scheduled in candidate beams that are separated in time and space from the other candidate beams. In other words if in one beam direction there is only one wireless device, then that device will have a dedicated beam quality reference signal, similar to in prior art solutions.

In the 5G example discussed above, the proposed solution implies that several wireless devices will be requested to monitor the same time and frequency resources for the same MRS (or beam quality reference signal) sequence. This is different from the LTE solution where one common reference signal is always on. In accordance with the proposed technique, beam quality reference signals are only scheduled where and when they are needed. However, the overhead of using individual beam quality reference signals is avoided, by letting several wireless devices use the same beam quality reference signal.

To explain this further, imagine that each wireless device needs to carry out their measurements within certain time windows. Each measurement session typically involves measuring on a beam set comprising several candidate beams, each defined by a unique sequence. The beams are typically transmitted in a sequence, so called beam-sweep.

If two beam sets of different wireless devices are identical in time and space, the operation of creating common signals is straight forward. The network simply requests the wireless devices to listen to the same sequence at the same time and frequency.

If two such time windows partly overlap in time, it might also possible schedule any overlapping or common beams (in space) within the overlapping time period, such that those transmissions reach both the wireless devices. Stated differently, the order of the beam quality measurement signals within a beam set can be scheduled such that those transmissions that are overlapping can be made to one and the same transmission.

In other words, in accordance with the proposed methods, common beam quality measurement signals, usable by at least two of the plurality of wireless devices 10, are scheduled S5 during overlaps of the obtained time periods, in at least two of the obtained candidate beams that are at least partly overlapping (in space). Further examples will be given below.

The method further comprises providing S6 information about the scheduled beam quality measurement signals to the access points 20 and/or wireless devices 10. If the proposed method is performed in an access point 20, then the access point informs the served wireless devices about when to measure the beam quality reference signals and about what sequences to monitor. In this case the information about the scheduled beam quality measurement signals is implicitly provided to the access point.

If the method is performed in an access point 20, then the access points also transmits S7 the beam quality reference signals at the given time in the scheduled direction or directions, or requests neighbor cells to do so.

However, if the proposed methods are performed in a coordination unit remote from the access point, then the coordination unit needs to signal, to the concerned access points, information about when and where beam quality reference signals are to be transmitted. The serving access points 20 of the respective wireless devices 10 will then typically inform the wireless devices about when to perform measurements and about which sequences to monitor.

Example Implementation

An example implementation of the proposed method and in particular of the identification S3 of overlapping beam directions will now be described in more detail using 5G terminology as an example. In this example the time parameter is not considered, but the implementation refers to one time unit. Hence, the step of obtaining S1 when the MRS is to be transmitted is implicit, that is, the example refers to one certain time unit. The time unit should be selected such that it is suitable for scheduling a sequence of candidate beam transmissions or a partial sequence of candidate beam transmissions, e.g. a slot or set of slots, a sub frame or set of subframes, a frame or set of frames. The steps are typically repeated for every time unit, when beam quality measurement signals are needed.

The implementation of the identification may be performed in an access point as well as in a remote unit as discussed above.

The example implementation may be summarized as:
(S2) Determine (i.e. obtain) candidate beam direction sets for all UEs k=1 . . . K: $B_k=\{D_{m(k)}\}$
the $k^{th}$ candidate set $B_k$ has size $M_k$, m(k)=1 . . . $M_k$.
beam $D_{m(k)}$ comes from one of the access points $A_n$, n=1 . . . N.
(S3) For each access point n, determine (i.e. identify) the total non-duplicated set of beams requested over all UEs:
$S_n=U_k$ {subsets of $B_k|D_{m(k)}\in An$}
(S5) Allocate (i.e. schedule) MRS and T/F resources to beams in all $S_n$
(S6, S7) Transmit MRS from all access points according to the allocation.

Figure 7:
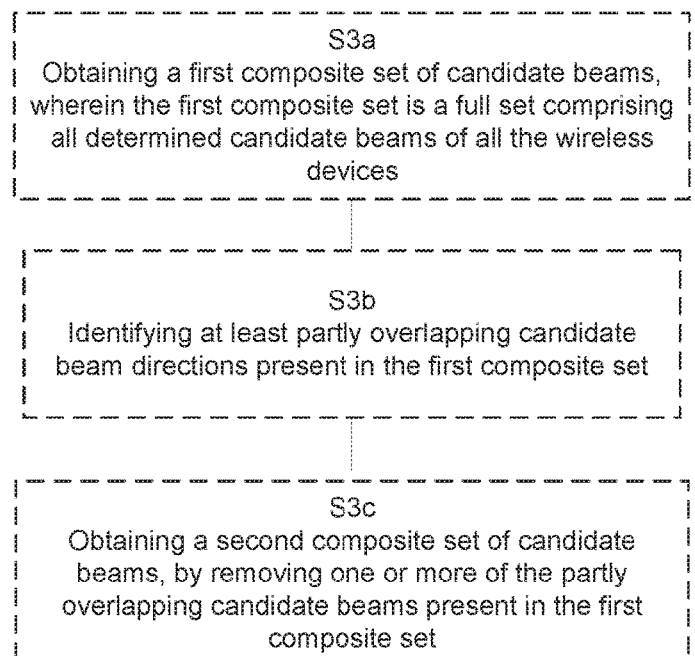
FIG. 7 is a flow chart that illustrates the identification of overlapping candidate beams in more detail according to some embodiments of the present disclosure.

The example implementation will now be described in more detail, referring to FIG. 7. In this example the identification of an overlap of at least two candidate beams S3 comprises obtaining S3a a first composite set of candidate beams, wherein the first composite set is a full set comprising all obtained candidate beams of all the wireless devices 10. In other words, candidate beam sets are first obtained for all UEs in the area for which MRS transmissions are required during the time unit that is being scheduled. This step is for example triggered by deteriorating serving beam quality to those UEs and the sets are obtained similar to the state of the art solution. This is done in a "conventional" manner. The determination may be based e.g. on the UE position and look-up table information about coverage areas of the possible candidate beams. To include beams from access points other than the serving access point for a given UE, the serving access point may inform other access points about the UE position. The beams expected to provide best signal quality for the UE in its current position are included as candidate beams by each access point. Each UE may thus have candidate beams from several access points. Each candidate beam is characterized e.g. by its direction and beam width.

After obtaining the first composite set, the method comprises identifying S3b at least partly overlapping candidate beam directions present in the first composite set, and obtaining S3c a second composite set of candidate beams, by removing one or more of the at least partly overlapping candidate beams present in the first composite set. Then beam quality measurement signals are scheduled in the beams of the second composite set. For example for each access point a list of all candidate beams from that access point (over all UEs) is created. Duplicate/multiple beams in that list are then removed to create a list of unique beams. This is repeated for all access points.

The identifying finally comprises removing S3c all but one of the candidate beams in each beam direction. This step comprises using the list of unique beams from each access point to allocate MRS sequences and T/F resources for MRS transmission. The allocation may be performed jointly over all access points, or individually for each access point. In the latter case, a preliminary MRS subset and T/F resource allocation among access points preferably exists to avoid conflicting MRS and T/F resource allocations. For each UE, the non-serving access points may signal the allocations to the UE's serving access point.

The union operation proposed in this disclosure may be performed per access point in a coordinated fashion. In an embodiment according to the full joint allocation option, the operations are performed in the following access points as follows.

Serving access points for UEs k=1 . . . K signal other access points (n=1 . . . N) the wireless device positions. All access points locally determine relevant candidate beams for all wireless devices. All access points locally identify S3 the non-duplicated (union) sets of beams. All access points signal their beam sets to the coordination unit (e.g. the main access point in a main-remote deployment). In other words, the coordination unit obtains S2, the beam sets for all the serving access points. The coordination unit jointly determines (or schedules S5) the beam quality reference signals and time/frequency resource allocation for all wireless devices and access points. The controlling unit signals or provides S6 the allocation to the serving access points and the transmitting access points.

Each wireless device receives a measurement command with beam quality reference signal lists to measure from their respective serving access points. The individual access points transmit their beam quality reference signals.

Collecting Wireless Devices with Simultaneous Beam Quality Reference Signal Needs Each wireless device and its need of a beam quality reference signal may appear individually and not at precisely the same time. The use of the methods described so far is that they are only usable when candidate beams for transmission of beam quality reference signals of two or more wireless devices overlap in time (taking into account a tolerance level in the order of milliseconds) and space. However, the effect may be increased if transmissions in candidate beams that are close in time and/or space can be "moved" such that a common beam quality reference signal can be transmitted.

One possibility is gathering some beam quality reference signal-needing wireless devices that are spread over a period of time (i.e. whose respective detections of handover need are distributed in the time period and whose ideal time for handover execution will also be distributed over a time period).

Another possibility is that available beam configurations may be modified to be able to form candidate beam sets that lead to more efficient, smaller unions. Modifying beam configurations may include shifting beam grid phase, spacing, and/or beam width for the mobility beams. This could be done e.g. based on wireless device velocity for one or more moving wireless devices. Optionally this could be the default strategy, e.g. as one of the steps in the default procedure, only limited by identified constraints, such as known coverage quality problems in certain directions and/or indicated wireless device positions, or signaled wireless device capabilities indicating poor reception capabilities.

As a specific example of the previous alternative, intentional "multicasting" of beam quality measurement signal beams could be applied, using a wider beam if that covers several wireless devices. This is particularly suitable if higher possible mobility beam resolution is not required, given the wireless device SNR operating points.

In other words, according to some aspects, the method further comprises changing S4 the transmission time or beam direction or size, of candidate beams that are potentially at least partly overlapping in space and/or that have a separation in time below a predefined threshold, such that common beam quality measurement signals usable by at least two of the plurality of wireless devices 10 can be scheduled.

When gathering wireless devices in time, the period of time should be rather short but still long enough to realistically enable grouping some handover-needing wireless devices together. When these wireless devices are "collected" in the access point, the access point may identify overlaps in the wireless devices respective sets of candidate beams and ensure (when possible) that wireless devices needing a common candidate beam are allocated the same MRS and transmission instant of that beam. The overlaps of candidate beams may be a "mesh" of relations between the wireless devices, so that coordinating the candidate beam transmissions so that all overlaps can be fully utilized may not always be possible (because of conflicts within the "mesh"). That coordination problem becomes more complicated in multi-access point cases if, for instance, if a first access point, AP1, and a second access point, AP2, both want the same candidate beam to be turned on in a third access point and the coordination between the involved wireless devices becomes a distributed coordination operation between AP1 and AP2 and across their respective sets of wireless devices.

The concept of waiting for a period of time to see if other handover-needing wireless devices turn up so that candidate beam set overlaps can be leveraged will result in compromises in terms of the timing of activation of candidate beams and eventually the timing of the handover executions. E.g. some wireless devices may have their candidate beams activated somewhat later than what would have been ideal, thereby increasing the risk of handover failure (and link loss). Similarly, handover execution may also occur slightly later than ideally for some wireless devices. These issues may be mitigated by triggering the entire procedure a bit earlier (i.e. adapting measurement thresholds accordingly), but this may also result in less accurate handover-need indications and possibly aborted handover procedures (where the wireless device eventually actually didn't need the handover).

One embodiment is not to wait for other handover-needing wireless devices to appear, but to go forth with the handover preparations (in terms of candidate beam selection and scheduling) for a wireless device as soon as its handover-need arises and see whether overlaps may be leveraged with some other wireless device for which the handover preparation is already ongoing. For instance, consider a case with a first wireless device, UE1, and a second wireless device, UE2. When handover preparation is triggered for UE2, the access point, AP, may discover (or already know) that one of the candidate beams already scheduled for handover-needing UE1 is needed also for UE2. The access point, AP, can then, if time permits, allocate the same candidate beam transmission (for that beam) to UE2.

It would also work smoothly in an inter-access point case. If a first access point, AP1, asks a second access point, AP2, to transmit beam 1 to UE2, then AP2 can respond "I am already scheduled (by request from a third access point, AP3, or internally) to transmit beam 1 (e.g. for UE1) at T/F resources X using MRS sequence X. If it suits you, you can utilize this transmission also for your UE2". AP1 could then either accept or reject this offer. If AP1 determines that the already scheduled beam transmission is OK, it may either send a confirmation message to AP2 or do nothing (i.e. the absence of further signaling to AP2 indicates that the offer is accepted). If AP1 determines that the offer cannot be fit into the sequence of candidate beam transmissions that UE2 needs, AP1 sends a message to AP2 indicating e.g. that AP1's original request for transmission of beam 1 is still valid (i.e. no overlap utilization) or does nothing (i.e. the absence of further signaling to AP2 indicates that AP1's original request for transmission of beam 1 is still valid).

Optionally, when initially requesting transmission of beam 1 (i.e. before being aware of any overlap), AP1 may indicate several acceptable time instants for transmission of beam 1 (as well as for transmission of any other candidate beam that AP1 may want to request from AP2) and let AP2 select one of them. Then, if AP2 is already scheduled to transmit beam 1 for another UE (e.g. UE1), then AP2 can immediately see if an overlap utilization is possible (i.e. if the transmission time already scheduled for beam 1 matches one of the acceptable time instants indicated by AP1) and if so, select that particular time of transmission. In any case AP2 responds to AP1 with the time instant(s) selected for transmission of the requested candidate beam(s). In this scenario AP1 will not even know whether any overlap utilization takes place or not.

UE Identity Grouping for the Grouped UEs

According to some aspects of the disclosure, the downlink control channel signaling may be made more efficient when common beam quality measurement signals are allocated to a group of wireless devices. Using LTE as an example, the MRS scheduling parameter info tells the UE where in Time/Frequency, T/F to measure the MRS, the assigned sequences, measurement and reporting modes, etc. Typically, the UE uses its own identity to decode Physical Downlink Control Channel, PDCCH. In the case of using the proposed technique, this may lead to that two UEs with separate identities, are decoding the same PDCCH information in two different locations, as the UEs are instructed to use the same beam quality reference signal. To avoid duplicating control information, the network would assign the grouped UEs a group identity, similar to C-RNTI, to be used for MRS configuration reception in these scenarios. In other words, according to some aspects, the wireless devices 10 sharing a common beam quality measurement signal also share a common group identifier, that can be used to identify information dedicated to the wireless devices 10.

Choosing Individual or Grouped Beam Quality Measurement Signals Allocation Strategy As a general principle, the network starts with the default solution i.e. allocates wireless device-specific beam quality measurement signals to all wireless devices and detects the beam quality measurement signal overlapping in a secondary step based on measurement reports, proximity algorithms or positioning.

However, in some embodiments, the network tentatively configures the grouped beam quality measurement signal allocation and checks whether it differs significantly from the dedicated configuration and provides gains according to some metric. In that case, the network switches to the grouped mode for some predetermined time period. The suitable mode may be re-checked periodically.

Figure 5:
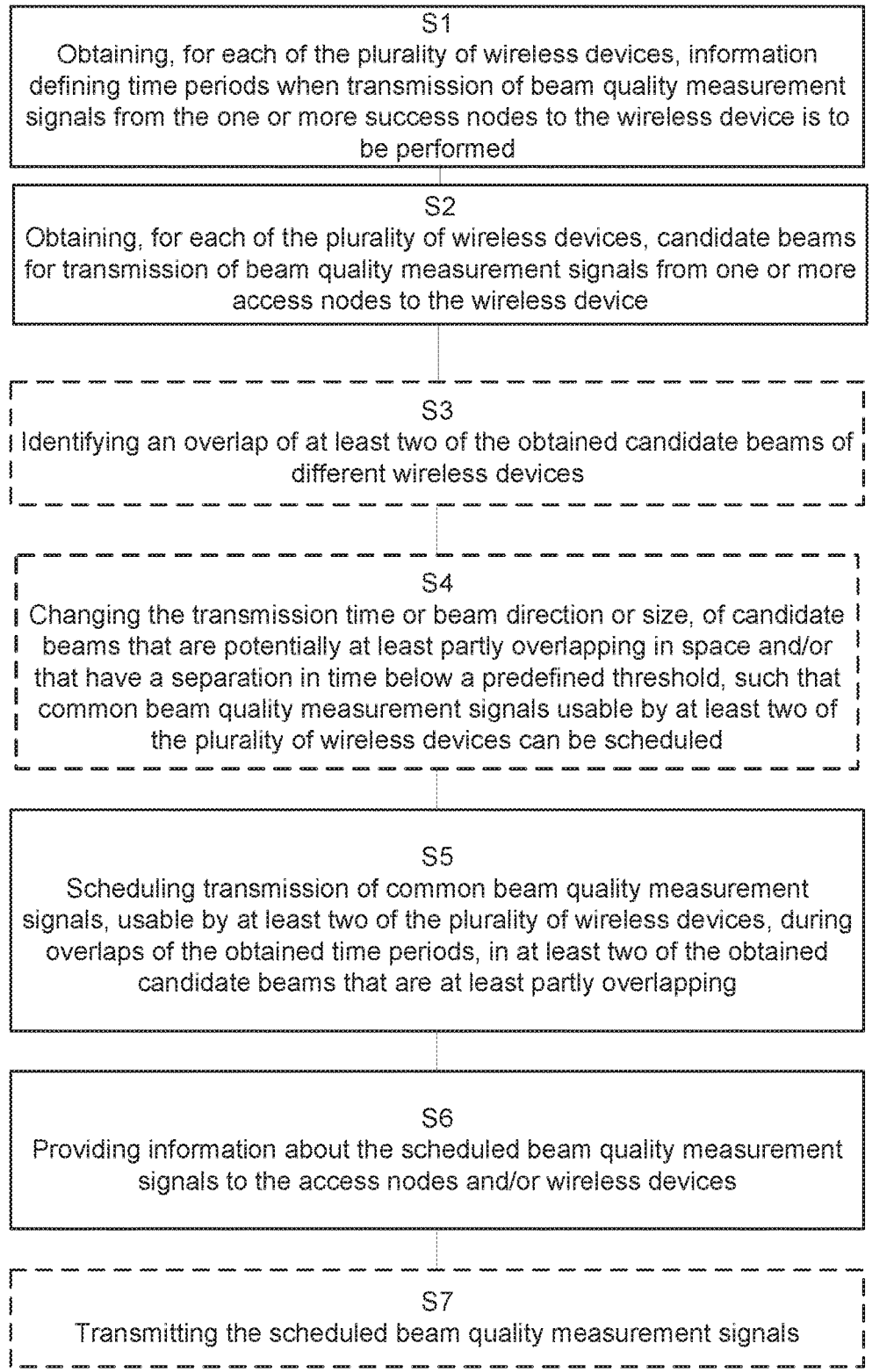
FIG. 5 is a flow chart that illustrates the method steps performed in the coordination unit according to the present disclosure.
Figure 8:
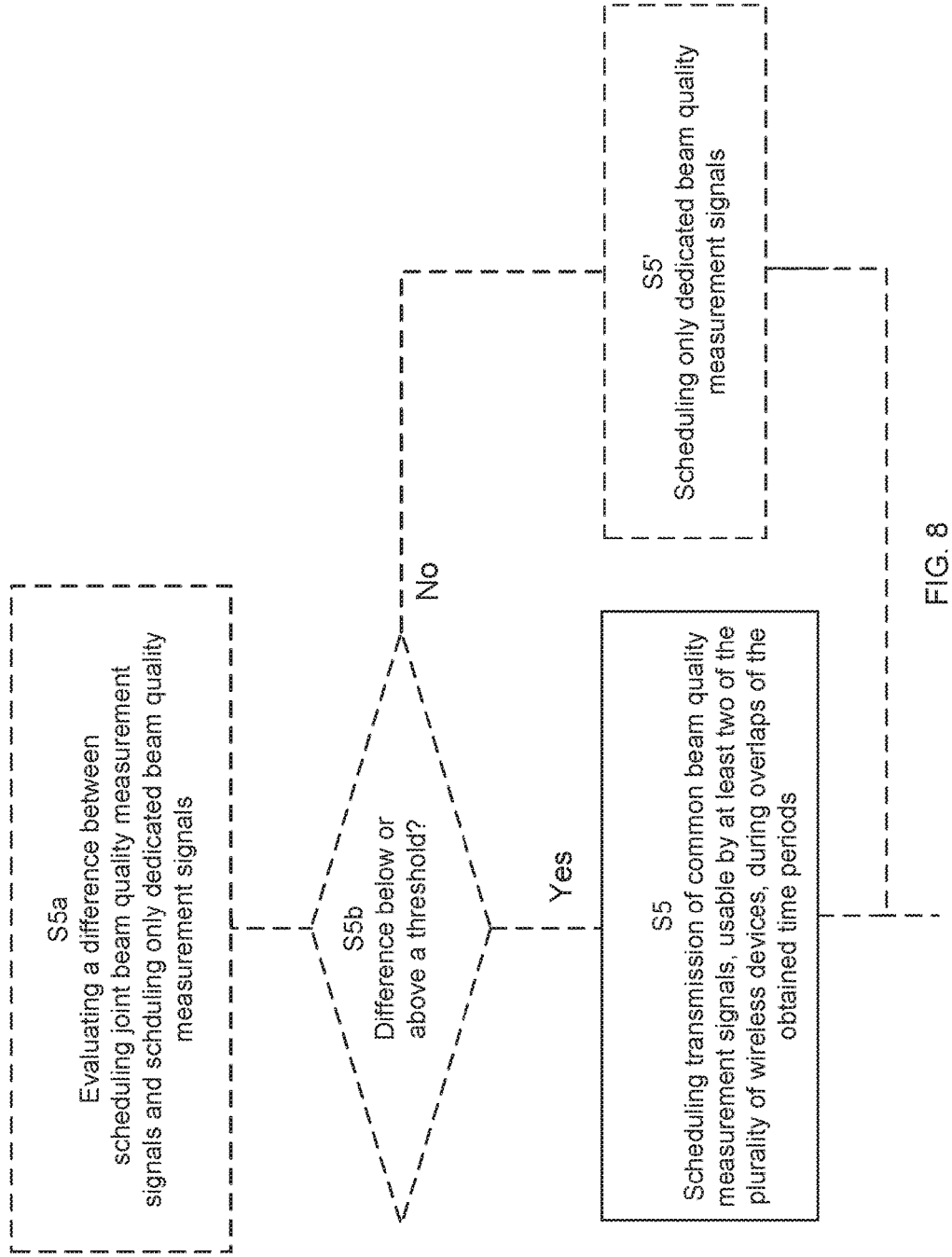
FIG. 8 is a flow chart that illustrates conditional use of grouped scheduling of beam quality reference signals according to some embodiments of the present disclosure.

FIG. 8 illustrates an example implementation, describing the scheduling S5 of FIG. 5 in more detail. In this example, the method comprises evaluating S5a a difference between scheduling common beam quality measurement signals for candidate beams that are overlapping in time and scheduling only dedicated beam quality measurement signals. In other words, the benefit of common reference signals is evaluated for example in terms of how much resources may be reutilized in comparison to the cost of identifying and scheduling the common signals. Different strategies may be used for the evaluation.

Hence, if evaluation S5b with regards to e.g. a threshold shows that use of union beam sets is beneficial, then the proposed method of scheduling common beam quality reference signals is executed as described above. In other words, the method then comprises applying a beam quality measurement signals configuration, wherein common beam quality measurement signals are scheduled for overlapping candidate beams, based on the evaluation. Hence, scheduling S5 is performed in accordance with the method described in FIG. 5. Otherwise a dedicated approach comprising wherein only dedicated beam quality measurement signals are scheduled S5', is used.

According to some aspects, the network can switch between the wireless device-specific beam quality measurement signal and the common or wireless device-grouping beam quality measurement signal based on the previously described detection, where a threshold could be defined for the signal strength difference between the different beams allocated for the different wireless devices, or for the other mechanisms described such as the proximity based where in that case the threshold would be a proximity measure.

Alternatively, a fixed choice of a per-wireless device or grouped beam quality measurement signal allocation strategy may be made based on deployment and/or load parameters.

When forming the union of wireless devices for which we jointly transmit beam quality measurement signals, one may also use the same union of wireless devices to simultaneously transmit measurement reports in uplink. These wireless devices can use the same uplink, UL, time resource, in a dynamic Time Division Duplex, TDD, pattern, whereby the receiver beamforming in the access point is simplified. This is applicable in reporting schemes where the wireless device reports a beam's quality back to the access point that transmitted that particular downlink, DL, beam. In one embodiment, all these wireless devices would use the same UL time resource but different frequency resources. In another, they use the same frequency resources, but are separated by different sequences.

Example Node Configuration

Figure 10:
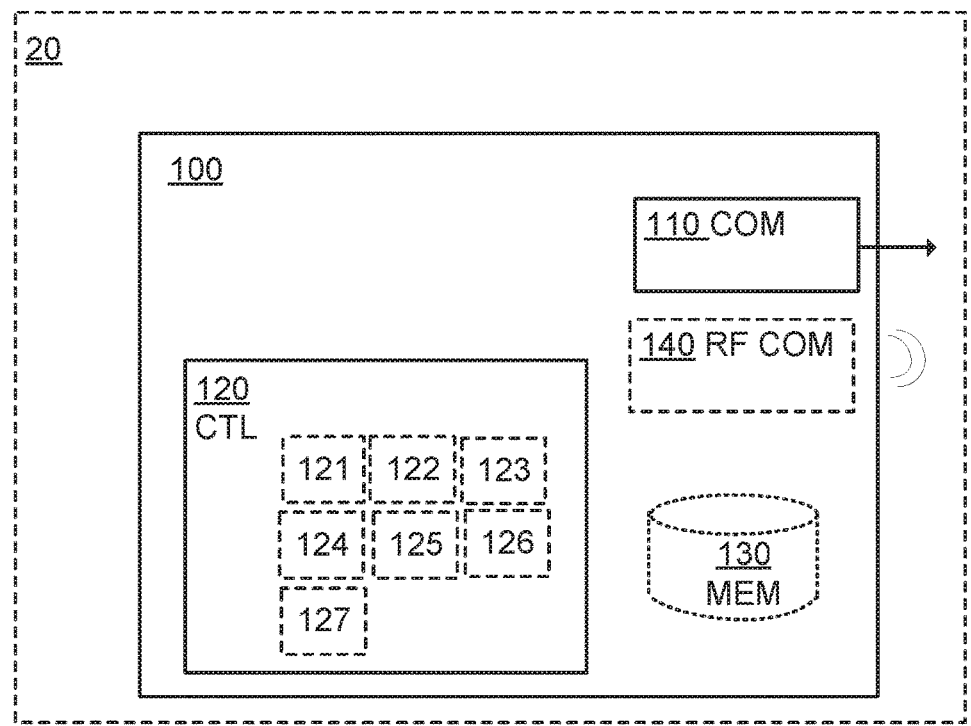
FIG. 10 illustrates an exemplary access point according to an embodiment of the present disclosure.

FIG. 10 illustrates an example of a coordination unit 100, according to some of the example embodiments, wherein the coordination unit is configured to schedule beam quality measurement signals to be transmitted from one or more access points 20 to a plurality of wireless devices 10, as described above.

As shown in FIG. 10, the coordination unit 100 according to some aspects comprises a network communication interface 110. The network communication interface 110 is configured for communication with other network nodes such as access points 20. This communication is often wired e.g. using fiber. However, it may as well be wireless.

If the coordination unit is an access point, the coordination unit 100 according to some aspects comprise a radio communication interface 140 configured to receive and transmit any form of communications or control signals to wireless devices 10 within a communication network. It should be appreciated that the radio communication interface 140 may be comprised as any number of transceiving, receiving, and/or transmitting units or circuitry. It should further be appreciated that the radio communication interface 140 may be in the form of any input/output communications port known in the art. The radio communication interface 140 may comprise RF circuitry and baseband processing circuitry (not shown).

The coordination unit 100 may further comprise at least one memory unit or circuitry 130 that may be in communication with the radio communication interface 140 and the network communication interface 110. The memory 130 may be configured to store received or transmitted data and/or executable program instructions. The memory 130 may also be configured to store any form of beam-forming information, reference signals, and/or feedback data or information. The memory 130 may be any suitable type of computer readable memory and may be of volatile and/or non-volatile type. According to some aspects, the disclosure relates to a computer program comprising computer program code which, when executed in a coordination unit, causes the coordination unit to execute any aspect of the described example access point operations.

According to some aspects, the disclosure relates to a computer program comprising computer program code which, when executed, causes a coordination unit 100 to execute the methods described above and below.

The coordination unit 100 may further comprise processing circuitry 120 which may be configured to cause the coordination unit to determine, for each of the plurality of wireless devices 10, candidate beams 40 for transmission of beam quality measurement signals from the one or more access points to the wireless device.

The processing circuitry is further configured to cause coordination unit to obtain, for each of the plurality of wireless devices 10, time periods when the transmission of beam quality measurement signals from the one or more access points 20 to the plurality of wireless devices 10 is to be performed.

The processing circuitry is further configured to schedule the beam quality measurement signals for transmission in the obtained candidate beams within the time periods defined by the obtained information, wherein common beam quality measurement signals, usable by at least two of the plurality of wireless devices 10, are scheduled during overlaps of the obtained time periods, in at least two of the obtained candidate beams that are at least partly overlapping, and to provide information about the scheduled beam quality measurement signals to the access points 20 and/or wireless devices 10.

The processing circuitry 120 may be any suitable type of computation unit, e.g. a processor, a microprocessor, digital signal processor, DSP, field programmable gate array, FPGA, or application specific integrated circuit, ASIC, or any other form of circuitry. It should be appreciated that the processing circuitry need not be provided as a single unit but may be provided as any number of units or circuitry. The processing circuitry is configured to implement all aspects of the methods as described above.

According to some aspects the processing circuitry 120 is configured to cause the coordination unit to schedule beam quality measurement signals usable by only one of the plurality of wireless devices 10 in candidate beams that are separated in time and space from the other candidate beams.

According to some aspects the processing circuitry 120 is configured to cause the coordination unit to identify an overlap of at least two of the candidate beams that are of different wireless devices.

According to some aspects the processing circuitry 120 is configured to cause the coordination unit to identify an overlap based on angle of arrival of signals received in the uplink direction from wireless devices 10, positioning information of wireless devices 10, proximity information of wireless devices 10.

According to some aspects the processing circuitry 120 is configured to cause the coordination unit to change the transmission time or beam direction or size, of candidate beams that are potentially at least partly overlapping in space and/or that have a separation in time below a predefined threshold, such that common beam quality measurement signals usable by at least two of the plurality of wireless devices 10 can be scheduled.

According to some aspects the coordination unit is comprised in an access point 20. Then the processing circuitry 120 is configured to cause the coordination unit to transmit S7 the scheduled beam quality measurement signals.

According to some aspects the processing circuitry 120 comprises modules configured to perform the methods described above. The modules are implemented in hardware or in software or in a combination thereof. The modules are according to one aspect implemented as a computer program stored in a memory 130 which run on the processing circuitry 120.

Hence, according to some aspects, the processing circuitry 120 comprises a first obtainer 121 configured to cause the coordination unit to obtain, for each of the plurality of wireless devices 10, candidate beams 40 for transmission of beam quality measurement signals from the one or more access points to the wireless device.

According to some aspects, the processing circuitry 120 comprises a second obtainer 122 configured to cause coordination unit to obtain, for each of the plurality of wireless devices 10, information defining time periods when the transmission of beam quality measurement signals from the one or more access points 20 to the plurality of wireless devices 10 is to be performed.

According to some aspects, the processing circuitry 120 comprises a scheduler 125 configured to cause coordination unit to schedule common beam quality measurement signals, usable by at least two of the plurality of wireless devices 10, during overlaps of the obtained time periods, in at least two of the obtained candidate beams that are at least partly overlapping.

According to some aspects, the processing circuitry 120 comprises a provider 126 configured to cause coordination unit to provide information about the scheduled beam quality measurement signals to the access points 20 and/or wireless devices 10.

According to some aspects, the processing circuitry 120 comprises an identifier 123 configured to cause coordination unit to identify an overlap of at least two of the candidate beams that are of different wireless devices.

According to some aspects, the processing circuitry 120 comprises an grouping unit 124 configured to cause coordination unit to change S4 the transmission time or beam direction or size, of candidate beams that are potentially at least partly overlapping in space and/or that have a separation in time below a predefined threshold, such that common beam quality measurement signals usable by at least two of the plurality of wireless devices 10 can be scheduled.

According to some aspects, the processing circuitry 120 comprises a transmitter unit 127 configured to cause coordination unit to transmit S7 the scheduled beam quality measurement signals.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method, performed in a wireless communication system, for scheduling one or more beam quality measurement signals to be transmitted from one or more access points to a plurality of wireless devices, the method comprising:
obtaining, for each of the plurality of wireless devices, information defining a time period when transmission of one or more beam quality measurement signals from the one or more access points to the wireless device is to be performed;
obtaining, for each of the plurality of wireless devices, information indicating one or more candidate beams for transmission of one or more beam quality measurement signals from the one or more access points to the wireless device;
scheduling transmission of a common beam quality measurement signal, usable by at least two of the plurality of wireless devices, during an overlap of the time periods, in at least two of the candidate beams that are at least partly overlapping; and
providing information about the scheduled common beam quality measurement signal to the one or more access points and/or the at least two of the wireless devices.

2. The method of claim 1, wherein beam quality measurement signals that are each usable by only one of the plurality of wireless devices are scheduled in candidate beams that are separated in time and space from other candidate beams.

3. The method of claim 2, wherein the scheduling comprises scheduling the common beam quality measurement signal in time and/or frequency.

4. The method of claim 2, comprising identifying an overlap of the at least two of the candidate beams that are for different wireless devices.

5. The method of claim 4, wherein the identifying comprises detecting reception of channel quality measurement reports received from at least two of the plurality wireless devices that differ by a quality below a threshold.

6. The method of claim 4, wherein the identifying is based on at least one of the following parameters:
angle of arrival of signals received in the uplink direction from wireless devices;
positioning information of wireless devices;
proximity information of wireless devices.

7. The method of claim 4, wherein the identifying comprises:
obtaining a first composite set of candidate beams, wherein the first composite set is a full set comprising all obtained candidate beams of all the plurality of wireless devices;
identifying at least partly overlapping candidate beams present in the first composite set; and
obtaining a second composite set of candidate beams, by removing one or more of the at least partly overlapping candidate beams present in the first composite set, wherein one or more beam quality measurement signals are scheduled in the candidate beams in the second composite set.

8. The method of claim 7, wherein the obtaining comprises removing all but one of the candidate beams in each beam direction.

9. The method of claim 2, comprising changing the transmission time or beam direction or size, of candidate beams that are potentially at least partly overlapping in space and/or that have a separation in time below a predefined threshold, such that the common beam quality measurement signal usable by at least two of the plurality of wireless devices can be scheduled.

10. The method of claim 2, comprising:
evaluating a difference between scheduling a common beam quality measurement signal for candidate beams that are overlapping in time and scheduling only dedicated beam quality measurement signals; and
applying a beam quality measurement signals configuration wherein a common beam quality measurement signal is scheduled for overlapping candidate beams, based on the evaluation.

11. The method of claim 2, comprising transmitting the scheduled common beam quality measurement signal.

12. The method of claim 2, wherein wireless devices sharing a common beam quality measurement signal also share a common group identifier, that can be used to identify information dedicated to the wireless devices.

13. A non-transitory computer-readable medium having stored thereon a computer program comprising computer program code which, when executed in a coordination unit configured for use in a wireless communication system, causes the coordination unit to schedule one or more beam quality measurement signals to be transmitted from one or more access points to a plurality of wireless devices, the computer program code causing the coordination unit to:
   obtain, for each of the plurality of wireless devices, information defining a time period when transmission of one or more beam quality measurement signals from the one or more access points to the wireless device is to be performed;
   obtain, for each of the plurality of wireless devices, information indicating one or more candidate beams for transmission of one or more beam quality measurement signals from the one or more access points to the wireless device;
   schedule transmission of a common beam quality measurement signal, usable by at least two of the plurality of wireless devices, during an overlap of the time periods, in at least two of the candidate beams that are at least partly overlapping; and
   provide information about the scheduled common beam quality measurement signal to the one or more access points and/or the at least two of the wireless devices.

14. A coordination unit configured for use in a wireless communication system, the coordination unit configured to schedule one or more beam quality measurement signals to be transmitted from one or more access points to a plurality of wireless devices, the coordination unit comprising:
   a network communication interface configured to communicate with the one or more access points, and
   processing circuitry configured to cause the coordination unit to:
      obtain, for each of the plurality of wireless devices, information defining a time period when transmission of one or more beam quality measurement signals from the one or more access points to the wireless device is to be performed;
      obtain, for each of the plurality of wireless devices, information indicating one or more candidate beams for transmission of one or more beam quality measurement signals from the one or more access points to the wireless device;
      schedule transmission of a common beam quality measurement signal, usable by at least two of the plurality of wireless devices, during an overlap of the time periods, in at least two of the candidate beams that are at least partly overlapping; and
      provide information about the scheduled common beam quality measurement signal to the one or more access points and/or the at least two of the wireless devices.

15. The coordination unit of claim 14, wherein the processing circuitry is configured to schedule beam quality measurement signals that are each usable by only one of the plurality of wireless devices in candidate beams that are separated in time and space from other candidate beams.

16. The coordination unit of claim 14, wherein the processing circuitry is configured to identify an overlap of the at least two of the candidate beams that are for different wireless devices.

17. The coordination unit of claim 16, wherein processing circuitry is configured to identify the overlap is based on at least one of the following parameters:
   angle of arrival of signals received in the uplink direction from wireless devices;
   positioning information of wireless devices; and
   proximity information of wireless devices.

18. The coordination unit of claim 14, wherein the processing circuitry is configured to change the transmission time or beam direction or size, of candidate beams that are potentially at least partly overlapping in space and/or that have a separation in time below a predefined threshold, such that the common beam quality measurement signal usable by at least two of the plurality of wireless devices can be scheduled.

19. The coordination unit of claim 14, wherein the processing circuitry is configured to transmit the scheduled common beam quality measurement signal.

20. An access point comprising a coordination unit configured for use in a wireless communication system, the coordination unit configured to schedule one or more beam quality measurement signals to be transmitted from one or more access points to a plurality of wireless devices, the coordination unit comprising:
   a network communication interface configured to communicate with the one or more access points; and
   processing circuitry configured to cause the coordination unit to:
      obtain, for each of the plurality of wireless devices, information defining a time period when transmission of one or more beam quality measurement signals from the one or more access points to the wireless device is to be performed;
      obtain, for each of the plurality of wireless devices, information indicating one or more candidate beams for transmission of one or more beam quality measurement signals from the one or more access points to the wireless device;
      schedule transmission of a common beam quality measurement signal, usable by at least two of the plurality of wireless devices, during an overlap of the time periods, in at least two of the candidate beams that are at least partly overlapping; and
      provide information about the scheduled common beam quality measurement signal to the one or more access points and/or the at least two of the wireless devices.

* * * * *